United States Patent
Swaminathan et al.

(10) Patent No.: US 12,218,929 B2
(45) Date of Patent: Feb. 4, 2025

(54) DISABLING A PASSWORD-BASED MODE OF AUTHENTICATION AND ENABLING A PASSWORD-LESS MODE OF AUTHENTICATION

(71) Applicant: Truist Bank, Charlotte, NC (US)

(72) Inventors: Sudhakar Swaminathan, Duluth, GA (US); Madhusudan Panda, Cary, NC (US)

(73) Assignee: Truist Bank, Charlotte, NC (US)

( * ) Notice: Subject to any disclaimer, the term of this patent is extended or adjusted under 35 U.S.C. 154(b) by 323 days.

(21) Appl. No.: 17/843,344

(22) Filed: Jun. 17, 2022

(65) Prior Publication Data

US 2023/0412587 A1    Dec. 21, 2023

(51) Int. Cl.
*H04L 9/40* (2022.01)
*H04L 67/55* (2022.01)

(52) U.S. Cl.
CPC ........ *H04L 63/083* (2013.01); *H04L 63/0435* (2013.01); *H04L 63/20* (2013.01); *H04L 67/55* (2022.05)

(58) Field of Classification Search
CPC ... H04L 63/083; H04L 63/0435; H04L 63/20; H04L 67/55; H04L 63/0861
See application file for complete search history.

(56) References Cited

U.S. PATENT DOCUMENTS

| | | | |
|---|---|---|---|
| 10,728,044 B1* | 7/2020 | Melo | H04L 9/0825 |
| 2007/0157019 A1* | 7/2007 | York | H04L 63/102 |
| | | | 713/155 |
| 2016/0269398 A1* | 9/2016 | Chhabra | H04L 63/0838 |
| 2019/0080072 A1* | 3/2019 | Van Os | G06F 3/016 |
| 2019/0139009 A1* | 5/2019 | Ikeuchi | G06Q 20/384 |
| 2020/0327219 A1* | 10/2020 | Bolimovsky | H04W 12/68 |
| 2021/0217022 A1* | 7/2021 | Loucks | G06Q 20/12 |
| 2022/0201008 A1* | 6/2022 | Stergioudis | G06N 3/045 |

* cited by examiner

*Primary Examiner* — J. Brant Murphy
(74) *Attorney, Agent, or Firm* — Kilpatrick Townsend & Stockton LLP; Michael A. Springs, Esq.

(57) ABSTRACT

A system can receive a request from a user device to disable a password-based mode of authentication associated with a user account. The user account can have a password usable for accessing account data associated with the user account and account functions associated with the user account. The system can receive verification from the user device for the request. The system can disable the password-based mode of authentication associated with the user account. The system can enable a password-less mode of authentication associated with the user account. The password-less mode of authentication can enable the user device to access account data associated with the user account and account functions associated with the user account without requiring the user to enter the password.

17 Claims, 4 Drawing Sheets

DISABLING A PASSWORD-BASED MODE OF AUTHENTICATION AND ENABLING A PASSWORD-LESS MODE OF AUTHENTICATION

CROSS REFERENCE TO RELATED APPLICATION

This is related to, and claims priority to, U.S. application Ser. No. 17/843,517, filed Jun. 17, 2022 and titled ENABLING A PASSWORD-BASED MODE OF AUTHENTICATION THROUGH A NON-DIGITAL AUTHENTICATION CHANNEL, the entirety of which is incorporated herein by reference.

TECHNICAL FIELD

The present disclosure relates to computer network technology and, more particularly (although not necessarily exclusively), to disabling a password-based mode of authentication and enabling a password-less mode of authentication associated with a user account in response to a request from a user device.

BACKGROUND

In some cases, a server can include one or more user accounts. A user may desire to access the user account for accessing data and functions associated with the user account. Often, a user account can be accessed using a password. For instance, the user can be prompted for the password. If the password is incorrect, the user can be denied access to data and functions associated with the user account. In response to receiving the correct password, the user can be granted access to the data and functions associated with the account.

SUMMARY

In one example, a system can include a processor and a non-transitory computer-readable memory. The non-transitory computer-readable memory can be executable by the processor to cause the system to receive a request from a user device to disable a password-based mode of authentication associated with a user account, the user account having a password usable for accessing account data associated with the user account and account functions associated with the user account. The system can receive verification from the user device for the request. The system can disable the password-based mode of authentication associated with the user account. The system can enable a password-less mode of authentication associated with the user account, wherein the password-less mode of authentication can enable the user device to access account data associated with the user account and account functions associated with the user account without requiring the user to enter the password.

DETAILED DESCRIPTION

Figure 1:
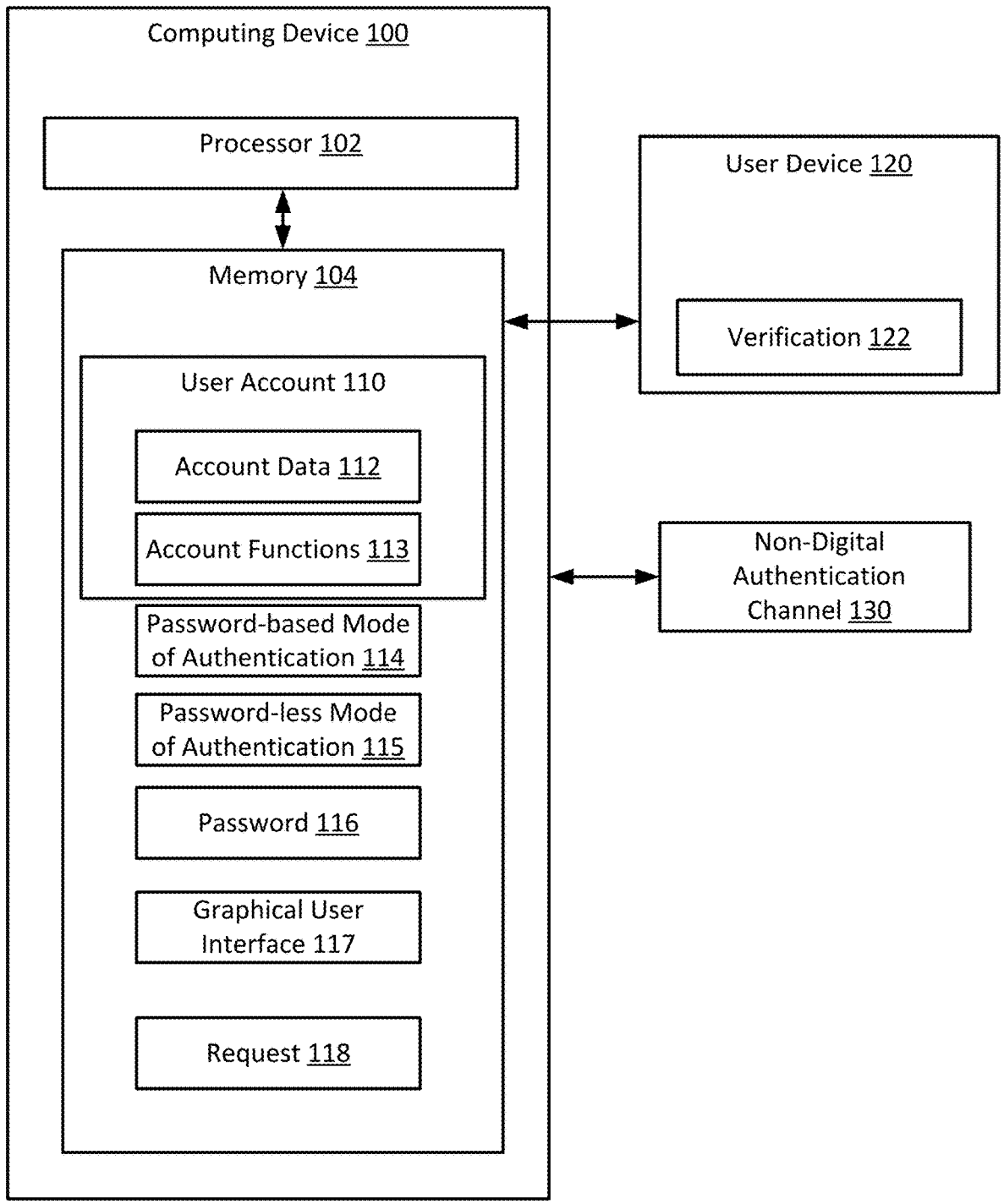
FIG. 1 is a schematic of a computing environment in which a computing device can disable a password-based mode of authentication and enable a password-less mode of authentication associated with a user account via a request from a user device, according to some aspects of the disclosure.

Certain aspects and features relate to disabling a password-based mode of authentication and enabling a password-less mode of authentication associated with a user account in response to a request from a user device. A password-based mode of authentication can involve prompting the user to enter a password. For example, if the password entered is correct, a computing device associated with the user account can grant the user access to the user account. Disabling the password-based mode of authentication can prevent the user from accessing the user account by entering the password. Enabling the password-less mode of authentication can enable the computing device to grant access to the user without requiring the user to enter a password. The request can be a TCP or HTTP request. For example, the user device can include a browser or application that can generate the TCP or HTTP request and issue a command to transmit the request to the computing device, or to a server that may be communicatively coupled to the computing device. In some examples, the request can include a command to retrieve data from the computing device. For example, the computing device can include a database and the request can include a database command for retrieving one or more entries in the database. In some examples, each user account may correspond to one or more entries in the database. For example, the entries can be associated with a unique identifier, such as a string, that can correspond to the user account. For example, the one or more entries in the database corresponding to the user account can include a flag or variable associated with the password-based mode of authentication, such as a Boolean flag or variable. Adjusting the value of the Boolean flag or variable can determine whether the password-based mode of authentication is honored. Similarly, the password-less mode of authentication can include a different Boolean flag or variable that can determine whether the password-less mode of authentication is honored.

In some examples, the computing device can disable the password categorically for all devices associated with the user account, or the computing device can disable the password for a specific target device or set of target devices. Once the password has been disabled, the password may not grant access to the user account. The password-less mode of authentication can include a biometric mode of authentication, a QR-code-based mode of authentication, an e-mail-based mode of authentication, an SMS-based mode of authentication, a physical key-based mode of authentication, a mobile-app-based mode of authentication, or any other type of authentication process that does not use a password in the authentication process. In some examples, the password-less mode of authentication can be a multi-factor mode of authentication that can combine multiple different password-less modes of authentication. Once the password has been disabled, the server can prevent access to the user account unless the user is properly authenticated via a password-less mode of authentication. That is, the server can prevent access to the user account in response to solely receiving a password, or a username and password combination, with a request to access the account. In some examples, a computing device can transmit an alert notification to a separate channel of communication with the user in response to receiving a password to attempt to access the user account.

In some examples, the password-based mode of authentication can be re-enabled via a non-digital authentication channel. For example, the user can visit a physical location that can be associated with an institution that can access and alter the account data. The user can communicate in-person with a representative from the institution to request that the password-based mode of authentication be re-enabled. The representative can receive one or more physical forms of verification from the user, such as an identification card, a driver's license, a passport, a social security card, or any other suitable form of verification. Based on the one or more physical forms of verification, the representative can issue a command to the computing device to re-enable the password-based mode of authentication. For example, the command can be a database command that alters the Boolean flag or variable corresponding to the password-based mode of authentication to re-enable the password-based mode of authentication. Similarly, the representative can issue a command to the computing device to enable the password-less mode of authentication.

In some examples, the password-based mode of authentication can be compromised and can present security challenges. For example, strong passwords can be difficult to remember or inconvenient for the user to input, and weak passwords can be guessed easily. Even strong passwords can be susceptible to phishing or other scrupulous forms of fraud or other crimes to obtain the information and access a user account. Malicious actors can commit fraudulent acts with stolen or guessed passwords before the system can detect the fraud. In such examples, it can be desirable to disable the password-based mode of authentication.

Furthermore, disabling a password-based mode of authentication and enabling a password-less mode of authentication associated with the user account can reduce a consumption of computing resources by the computing device associated with the user account. For example, disabling the password-based mode of authentication can provide faster access to account data associated with the user account by removing a delay associated with the user entering a password and by preventing the computing device from consuming resources due to comparing the entered password string with a correct password string. And, disabling the password-based mode of authentication can increase a security associated with the user account and can reduce the likelihood of a malicious actor accessing the account data.

In the following description, for the purposes of explanation, specific details are set forth to provide a thorough understanding of various implementations and examples. Various implementations can be practiced without these specific details. The figures and description are not intended to be restrictive.

FIG. 1 is a schematic of a computing environment in which a computing device can disable a password-based mode of authentication 114 and enable a password-less mode of authentication associated with a user account 110 via a request 118 from a user device 120. The computing environment can include a computing device 100 that can be coupled to a user device 120. The computing device 100 can be the same as or different from the user device 120, and can include a server, such as a cloud computing server. The computing device 100 can be coupled to the user device 120 over a network, such as the Internet. Additionally or alternatively, the computing device 100 can be coupled to the user device 120 via a physical connection or local area network. The computing device 100 can include a memory 104 that can be a non-transitory computer-readable medium. The memory 104 can store instructions that can be executed by a processor in the computing device 100. The computing device 100 can include a processor 102 that can be communicatively coupled to a memory 104. The memory 104 can include instructions that can be executable by the processor 102 for causing the processor 102 to perform operations.

The processor 102 can include one processor or multiple processors. Non-limiting examples of the processor 102 include a Field-Programmable Gate Array (FPGA), an application-specific integrated circuit (ASIC), a microprocessor, etc. The processor 102 can execute instructions stored in the memory 104 to perform one or more operations. In some examples, the instructions can include processor-specific instructions generated by a compiler or an interpreter from code written in any suitable computer-programming language, such as C, C++, C#, etc.

For example, the processor 102 can receive a request 118 from a user device 120 to disable a password-based mode of authentication 114 and enable a password-less mode of authentication 115 that can be associated with a user account 110. For example, the user device 120 can issue a request 118 to disable a password-based mode of authentication 114. The processor 102 can disable the password-based mode of authentication 114 by disabling a password 116. The processor 102 can receive verification 122 from the user device 120 for the request 118. In some examples, the processor 102 can transmit a push notification to the user device 120 prompting the user to verify the request 118. For example, the user can interact with an interactive element of the push notification to verify the request 118. The user device 120 can transmit the verification 122 to the computing device 100.

In some examples, the password-less mode of authentication 115 can include a biometric mode of authentication. For example, the user device 120 can be equipped with a biometric sensor, such as a fingerprint scanner. Additionally or alternatively, the user device 120 can a include a camera and facial recognition software. The user device 120 can use the biometric sensor to obtain biometric data from an individual. The computing device 100 or the user device 120 can determine whether the biometric data obtained from the biometric sensor corresponds to the user or not. If the biometric data corresponds to the user, the user can be granted access to the user account 110 and account data 112 and account functions 113 associated therewith.

The password-less mode of authentication 115 can include a QR-code-based mode of authentication. For example, the user can be issued a physical object with a QR code by an institution associated with the user account 110. The user device 120 can scan the QR code with a camera. The user device 120 can decode the QR code to determine a command. The user device 120 can issue the command to receive access to the user account 110 and account data 112 and account functions 113 associated therewith.

The password-less mode of authentication 115 can include an e-mail-based mode of authentication. For example, the computing device can transmit an e-mail to an e-mail account associated with the user. In some examples, the e-mail can include a code. The user can be prompted to enter the code. Upon receiving the code, the system can permit the user with access to the user account 110, including account data 112 and account functions 113 associated therewith.

Additionally or alternatively, the password-less mode of authentication 115 can include an SMS-based mode of authentication. For example, the user device 120 can transmit the request 118 to the computing device 100 to access the user account 110. The computing device 100 can transmit a first text message to the user device 120 requesting verification. The user device 120 can transmit a second text message to the computing device 100 to verify the request 118. In response to verifying the request 118, the computing device 100 can grant the user device 120 access to account data 112 associated with the user account 110 and account functions 113 associated with the user account 110.

The password-less mode of authentication 115 can include a mobile-app-based mode of authentication. For example, the user device 120 can include a mobile app that can be associated with an institution that can access and alter the account data 112 and account functions 113 associated with the user account 110. In some examples, the user device 120 can generate the request 118 via interactive elements of the mobile app. The user device 120 can use interactive elements of the mobile app to verify the request 118. In response to the request 118, the computing device 100 can grant the user device 120 access to account data 112 associated with the user account 110 and account functions 113 associated with the user account 110. In some examples, the password-less mode of authentication 115 can be a multi-factor mode of authentication that can combine several of the password-less modes of authentication 115 described previously.

In some examples, the password-based mode of authentication 114 can be re-enabled via a non-digital authentication channel 130. For example, the user can visit a physical location that can be associated with an institution that can access and alter the account data 112 and account functions 113 associated with the user account 110. The user can communicate in-person with a representative from the institution to request that the password-based mode of authentication be re-enabled. The representative can receive one or more physical forms of verification from the user, such as an identification card, a driver's license, a passport, a social security card, or any other suitable form of verification. Based on the one or more physical forms of verification, the representative can issue a command to the computing device to re-enable the password-based mode of authentication 114.

Figure 2:
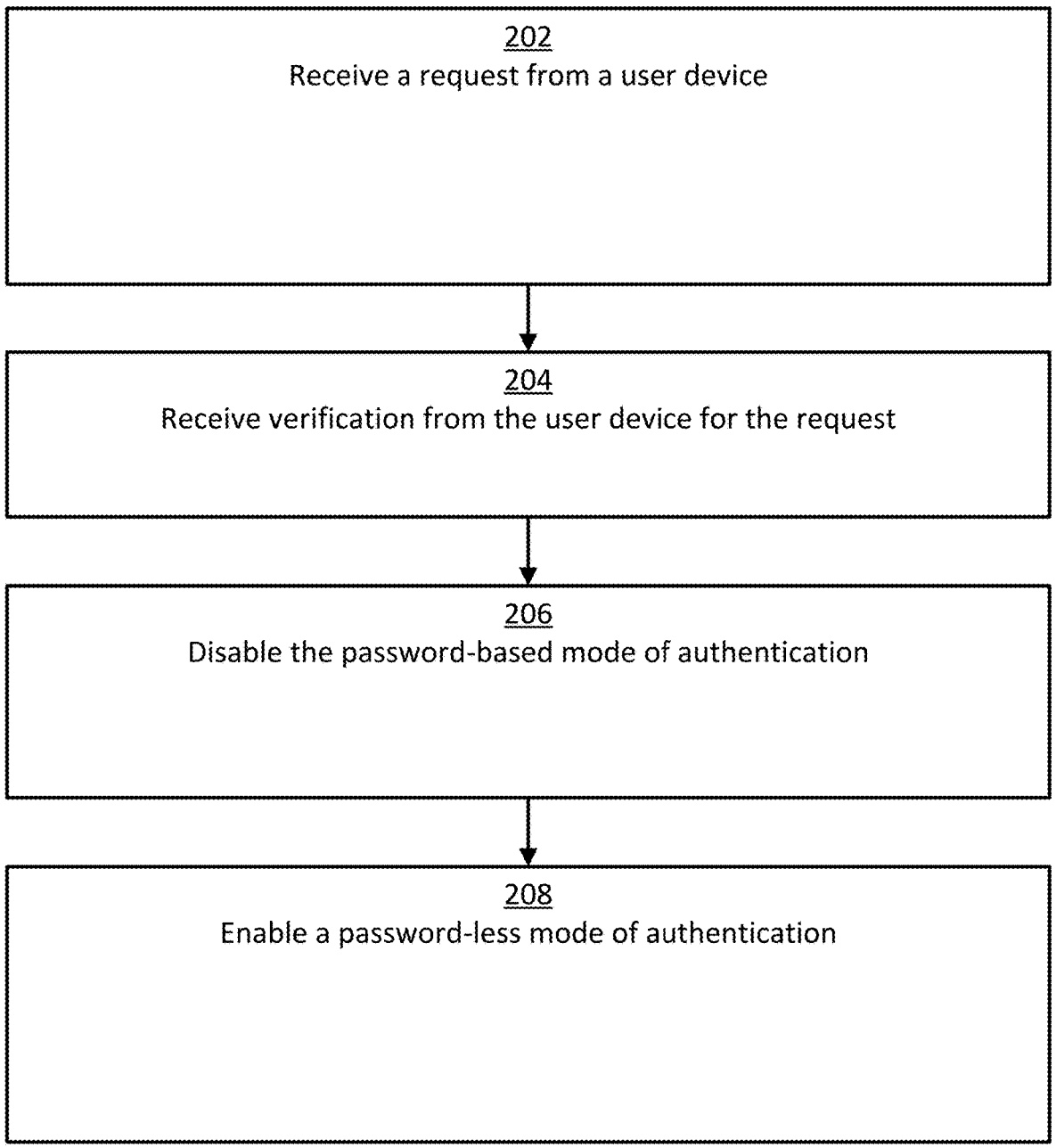
FIG. 2 is a flow chart of a process by which a computing device can disable a password-based mode of authentication and enable a password-less mode of authentication associated with a user account via a request from a user device, according to some aspects of the disclosure.

FIG. 2 is a flow chart of a process by which a computing device can disable a password-based mode of authentication and enable a password-less mode of authentication associated with a user account via a request from a user device, according to some aspects of the disclosure.

At block 202, the computing device can receive a request from a user device to disable a password-based mode of authentication associated with a user account. The user account can include a password corresponding to the password-based mode of authentication that can be used for accessing account data associated with the user account and account functions associated with the user account. The request may be a TCP or HTTP request. For example, the user device can include a browser or application that can generate the TCP or HTTP request and issue a command to transmit the request to the computing device, or to a server that may be communicatively coupled to the computing device. In some examples, the request can include a command to retrieve data from the computing device. For example, the computing device can include a database and the request can include a database command for retrieving one or more entries in the database. In response to receiving the request, the computing device may transmit a response to the user device for requesting verification from the user device.

At block 204, the computing device can receive verification from the user device for the request. In some examples, the user device can transmit a certificate that can include the verification to the computing device. The computing device can store the verification in local memory. In some examples, the verification can expire after one use or after an amount of time that can be determined by the computing device.

At block 206, the computing device can disable the password-based mode of authentication associated with the user account. Once the password-based mode of authentication has been disabled, the computing device may not honor requests to access the user account that are associated with the password until the password-based mode of authentication is re-enabled. The user can re-enable the password-based mode of authentication through a non-digital authentication channel. For example, the user can visit a physical location that can be associated with an institution that can access and alter the account data and account functions associated with the user account. The user can communicate in-person with a representative from the institution to request that the password-based mode of authentication be re-enabled. The representative can receive one or more physical forms of verification from the user, such as an identification card, a driver's license, a passport, a social security card, or any other suitable form of verification. Based on the one or more physical forms of verification, the representative can issue a command to the computing device to re-enable the password-based mode of authentication.

At block 208, the computing device can enable a password-less mode of authentication associated with the user account. For example, the account data associated with the user account can include a flag or variable associated with each password-less mode of authentication available to the user account. The flag or variable can indicate which password-less mode(s) of authentication can verify requests to access the account data and account functions associated with the user account. The password-less mode of authentication can enable the user device to access account data associated with the user account and account functions associated with the user account without requiring the user to enter the password. The password-less mode of authentication can include a biometric mode of authentication, a QR-code-based mode of authentication, an e-mail-based mode of authentication, an SMS-based mode of authentication, a physical key-based mode of authentication, or a mobile-app-based mode of authentication.

Figure 3:
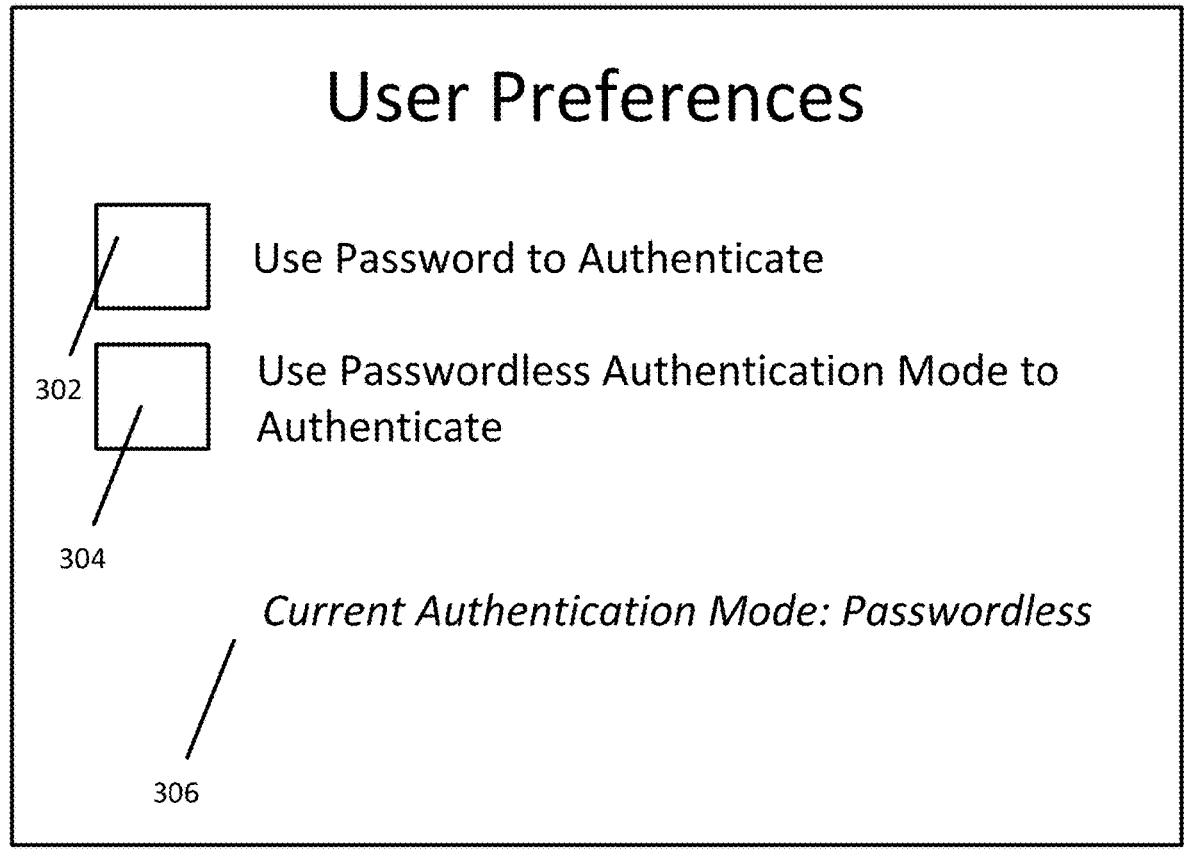
FIG. 3 is a graphical user interface that can be displayed on the user device for allowing for a password-based mode of authentication to be disabled, according to some aspects of the disclosure.

FIG. 3 is an illustration of an example of a graphical user interface that can be displayed on the user device, by which a computing device can disable a password—based mode of authentication and enable a password-less mode of authentication associated with a user account via a request from a user device. The user device 120 can display the graphical user interface 300. The graphical user interface 300 may include a first interactive graphical element 304. The user can use the first interactive graphical element 304 to issue a request 118 for disabling a password-based mode of authentication 114 that can correspond to a user account 110. The user can use a second interactive graphical element 302 to enable the password-less mode of authentication 115. The graphical user interface 300 can include an indicator 306 that can indicate a current mode of authentication 114. In some examples, certain elements of the graphical user interface 300 can enable the user to schedule an appointment to access a non-digital authentication channel 130. For example, the user can schedule an appointment to access a physical location of an institution associated with the user account.

Figure 4:
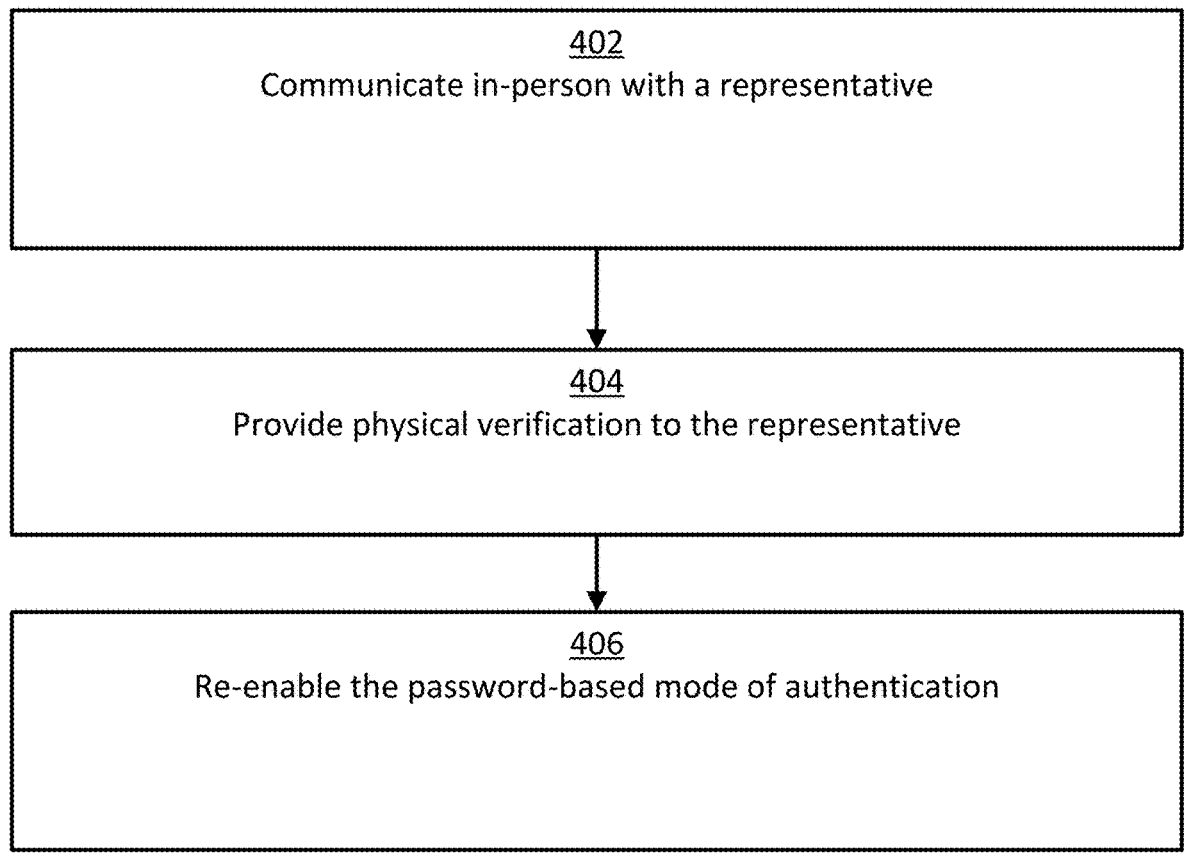
FIG. 4 is a flow chart of a process by which a computing device can re-enable a password-based mode of authentication in response to authentication via a non-digital authentication channel, according to some aspects of the disclosure.

FIG. 4 is a flow chart of a process by which a computing device can re-enable a password-based mode of authentication by a non-digital authentication channel according to some aspects.

At block 402, the user can communicate in-person with a representative from the institution associated with the user account to request that the password-based mode of authentication 114 be re-enabled. The in-person communication can take place in a physical location associated with the institution, such as a branch location.

At block 404 The representative can receive one or more physical forms of verification from the user, such as an identification card, a driver's license, a passport, a social security card, or any other suitable form of verification. The representative can inspect the physical forms of verification provided by the user to determine whether or not the physical forms of verification are valid.

At block 406, based on the one or more physical forms of verification, the representative can issue a command to the computing device to re-enable the password-based mode of authentication 114. For example, the representative can issue a database command to alter the Boolean flag or variable associated with the password-based mode of authentication to enable the password-based mode of authentication 114. Additionally or alternatively, the representative can issue a command to the computing device to disable the password-less mode of authentication. For example, the command can be a database command for altering the Boolean flag or variable associated with the password-less mode of authentication.

The foregoing description of certain examples, including illustrated examples, has been presented only for the purpose of illustration and description and is not intended to be exhaustive or to limit the disclosure to the precise forms disclosed. Numerous modifications, adaptations, and uses thereof are possible without departing from the scope of the disclosure. For example, any example described herein can be combined with any other example to yield further examples.

What is claimed is:

1. A system comprising:
   a processor; and
   a non-transitory computer-readable memory that is executable by the processor to cause the system to:
      receive a request from a user device to disable a password-based mode of authentication associated with a user account, the user account having a password usable for accessing account data associated with the user account and account functions associated with the user account;
      receive verification from the user device for the request;
      disable the password-based mode of authentication associated with the user account; and
      enable a password-less mode of authentication associated with the user account that is configured to provide the user device with access to account data associated with the user account and account functions associated with the user account without requiring a user to enter the password, wherein the system is configured to re-enable the password-based mode of authentication by receiving a second request via a non-digital authentication channel.

2. The system of claim 1, wherein the non-transitory computer-readable memory is further executable by the processor to cause the system to transmit a push notification to the user device prompting the user to verify the request.

3. The system of claim 1, wherein the non-transitory computer-readable memory is further executable by the processor to cause the system to enable the password-less mode of authentication in response to receiving the request from the non-digital authentication channel.

4. The system of claim 1, wherein the password-less mode of authentication comprises at least one of: a biometric mode of authentication, a QR-code-based mode of authentication, an e-mail-based mode of authentication, an SMS-based mode of authentication, a physical key-based mode of authentication, or a mobile-app-based mode of authentication.

5. The system of claim 1, wherein the non-transitory computer-readable memory is further executable by the processor to cause the system to transmit an alert notification to the user in response to detecting an attempt to access the user account with the password.

6. The system of claim 1, wherein the non-transitory computer-readable memory is further executable by the processor to cause the system to display a graphical user interface on the user device, the graphical user interface comprising interactive elements usable for selecting the password-less mode of authentication.

7. A method comprising:
   receiving, by a processor, a request from a user device to disable a password-based mode of authentication associated with a user account, the user account having a password usable for accessing account data associated with the user account and account functions associated with the user account;
   receiving verification from the user device for the request;
   disabling, by the processor, the password-based mode of authentication associated with the user account; and
   enabling, by the processor, a password-less mode of authentication associated with the user account that provides the user device with access to account data associated with the user account and account functions associated with the user account without requiring a user to enter the password, wherein the password-based mode of authentication is re-enabled by the user via a non-digital authentication channel by receiving the request from the non-digital authentication channel.

8. The method of claim 7, further comprising:
   transmitting, by the processor, a push notification to the user device prompting the user to verify the request.

9. The method of claim 7, wherein disabling the password-based mode of authentication associated with the user account further includes disabling the password.

10. The method of claim 7, wherein the password-less mode of authentication includes at least one of: a biometric mode of authentication, a QR-code-based mode of authentication, an e-mail-based mode of authentication, an SMS-based mode of authentication, a physical key-based mode of authentication, or a mobile-app-based mode of authentication.

11. The method of claim 7, further comprising:
transmitting an alert notification to the user in response to detecting an attempt to access the user account with the password.

12. The method of claim 7, further comprising:
displaying, by the processor, a graphical user interface on the user device, the graphical user interface comprising interactive elements; and
selecting, by the processor and the interactive elements, the password-less mode of authentication.

13. A non-transitory computer-readable medium comprising instructions executable by a processor for causing the processor to:
receive a request from a user device to disable a password-based mode of authentication associated with a user account, the user account having a password usable for accessing account data associated with the user account and account functions associated with the user account;
receive verification from the user device for the request;
disable the password-based mode of authentication associated with the user account; and
enable a password-less mode of authentication associated with the user account that is configured to provide the user device with access to account data associated with the user account and account functions associated with the user account without requiring a user to enter the password, wherein the password-based mode of authentication is configured to be re-enabled by the user via a non-digital authentication channel.

14. The non-transitory computer-readable medium of claim 13, further comprising instructions executable by the processor for causing the processor to transmit a push notification to the user device prompting the user to verify the request.

15. The non-transitory computer-readable medium of claim 13, further executable by the processor for causing the processor to enable a password-less mode of authentication in response to receiving the request from the non-digital authentication channel.

16. The non-transitory computer-readable medium of claim 13, wherein the password-less mode of authentication comprises at least one of: a biometric mode of authentication, a QR-code-based mode of authentication, an e-mail-based mode of authentication, an SMS-based mode of authentication, a physical key-based mode of authentication, or a mobile-app-based mode of authentication.

17. The non-transitory computer-readable medium of claim 13 further comprising instructions executable by the processor for causing the processor to transmit an alert notification to the user in response to detecting an attempt to access the user account with the password.

\* \* \* \* \*